(12) United States Patent
Yasuda et al.

(10) Patent No.: US 8,871,118 B2
(45) Date of Patent: Oct. 28, 2014

(54) SEMI-CONDUCTIVE RUBBER COMPOSITION AND VULCANIZATE THEREOF

(75) Inventors: Yoritaka Yasuda, Osaka (JP); Toyofumi Otaka, Osaka (JP); Tadahiro Ono, Osaka (JP); Koushiro Hamaguchi, Osaka (JP)

(73) Assignee: Daiso Co., Ltd., Osaka-Shi (JP)

( * ) Notice: Subject to any disclaimer, the term of this patent is extended or adjusted under 35 U.S.C. 154(b) by 197 days.

(21) Appl. No.: 13/127,019

(22) PCT Filed: Oct. 28, 2009

(86) PCT No.: PCT/JP2009/068468
§ 371 (c)(1), (2), (4) Date: Apr. 29, 2011

(87) PCT Pub. No.: WO2010/050494
PCT Pub. Date: May 6, 2010

(65) Prior Publication Data
US 2011/0210296 A1    Sep. 1, 2011

(30) Foreign Application Priority Data
Oct. 29, 2008 (JP) ................................. 2008-278743

(51) Int. Cl.
*H01B 1/12* (2006.01)
*C08L 9/02* (2006.01)
*C08L 71/03* (2006.01)
*G03G 15/16* (2006.01)
*G03G 15/08* (2006.01)
*G03G 15/02* (2006.01)
*C08K 3/22* (2006.01)
*C08K 5/3465* (2006.01)
*C08K 5/40* (2006.01)
*C08L 33/20* (2006.01)

(52) U.S. Cl.
CPC . *C08L 9/02* (2013.01); *C08L 71/03* (2013.01); *G03G 15/1685* (2013.01); *C08K 3/22* (2013.01); *C08K 5/3465* (2013.01); *C08K 5/40* (2013.01); *G03G 15/0818* (2013.01); *C08L 33/20* (2013.01); *G03G 15/0233* (2013.01); *G03G 15/0808* (2013.01)

USPC ...... 252/519.33; 399/176; 399/313; 523/453; 524/114; 524/322

(58) Field of Classification Search
USPC .............. 252/519.33; 523/453; 524/322, 114; 399/313, 176
See application file for complete search history.

(56) References Cited

U.S. PATENT DOCUMENTS

| 5,912,288 A | * | 6/1999 | Nishimoto et al. | ........... 524/114 |
| 6,078,778 A | * | 6/2000 | Murata et al. | ................. 399/313 |
| 6,949,606 B1 | | 9/2005 | Nishimura et al. | |
| 8,275,292 B2 | * | 9/2012 | Tomari et al. | ................. 399/176 |

FOREIGN PATENT DOCUMENTS

| JP | 2000-191837 | 7/2000 |
| JP | 2000-212330 | 8/2000 |
| JP | 2000-313769 | 11/2000 |
| JP | 2003-096253 | 4/2003 |
| JP | 2006-091118 | 4/2006 |

OTHER PUBLICATIONS

Office Action mailed Aug. 15, 2012 in corresponding Chinese Patent Application No. 200980143370.8.
International Search Report; Application No. PCT/JP2008/068468.
Extended European Search reported issued Jul. 5, 2012 in corresponding Application No. 09823604.5.
Office Action dated Apr. 24, 2013 in corresponding European Patent Application No. 09823604.5.
Office Action issued Feb. 1, 2013 in corresponding Chinese Application No. 200980143370.8.
Office Action issued Feb. 24, 2014 in corresponding Japanese Patent Application No. 2010-535810.

* cited by examiner

*Primary Examiner* — Khanh Tuan Nguyen
(74) *Attorney, Agent, or Firm* — Knobbe Martens Olson & Bear LLP

(57) ABSTRACT

The present invention provides a rubber composition, which realizes low hardness and low compression set while maintaining semi-conductivity, and a vulcanizate thereof. Also the rubber composition can be obtained by blending an epichlorohydrin-based rubber having satisfactory semi-conductivity and an acrylonitrile-butadiene-based rubber as a reactive plasticizer, and also blending zinc oxide, a thiuram-based compound and a quinoxaline-based compound.

11 Claims, No Drawings

SEMI-CONDUCTIVE RUBBER COMPOSITION AND VULCANIZATE THEREOF

CROSS-REFERENCE TO RELATED APPLICATIONS

This application is the U.S. National Phase under 35. U.S.C. §371 of International Application PCT/JP2009/068468, filed Oct. 28, 2009, which claims priority to Japanese Patent Application No. 2008-278743, filed Oct. 29, 2008. The International Application was published under PCT Article 21(2) in a language other than English.

TECHNICAL FIELD

The present invention relates to a semi-conductive rubber composition and a vulcanizate thereof, and they are used as a material constituting a developing roll, a charging roll and a transfer roll of an electrophotographic process in a copying machine, a printer and the like.

BACKGROUND ART

Since developing, charging and transfer rolls used in a laser printer or the like are in contact with a photoreceptor because of its mechanism, in addition to its semi-conductivity, low hardness, satisfactory compression set and shape retentivity to the ambient environment are required. Commonly, an ethylene-propylene rubber, a urethane rubber, an epichlorohydrin rubber, an acrylonitrile-butadiene rubber and the like have been used in the form of a blend or used alone in response to volume resistivity required to each of conductive, developing and transfer rolls.

There has hitherto been employed, as a method of realizing low hardness of a rubber material, a method of adding a low-viscosity substance such as a process oil or a plasticizer. However, the addition of these plasticizers to a conductive rubber composition is not preferred since there is a fear of contamination on a photoreceptor. Therefore, the addition of a liquid acrylonitrile-butadiene rubber with a low molecular weight has been studied so as to obtain a low-hardness rubber material without causing contamination of the photoreceptor (see Patent Document 1). The addition of the liquid acrylonitrile-butadiene rubber causes adhesion onto the photoreceptor and exerts an adverse influence on compression set. This reason is considered that a low-viscosity liquid rubber is not involved in crosslinking.

PRIOR ART DOCUMENT

Patent Document

Patent Document 1: JP-A-2006-91118

SUMMARY OF THE INVENTION

Problems to be Solved by the Invention

Under these circumstances, the present invention has been made and an object thereof is to provide a rubber composition, which realizes low hardness and low compression set while maintaining semi-conductivity, and a vulcanizate thereof. The quinoxaline-based compound used in the present invention is an excellent vulcanizing agent which imparts excellent low compression set to a vulcanizate obtained by vulcanization. However, even in the case of using the quinoxaline-based compound as a vulcanizing agent, the addition of the acrylonitrile-butadiene rubber in the amount enough to lower hardness of the vulcanizate, particularly the addition of the liquid acrylonitrile-butadiene rubber causes severe deterioration of compression set of the vulcanizate obtained by vulcanization, as described above. On the other hand, the addition of the acrylonitrile-butadiene rubber, particularly the addition of a small amount of the liquid acrylonitrile-butadiene rubber scarcely exerts an influence on compression set of a rubber material. However, it is impossible to sufficiently lower hardness of the vulcanizate. An object of the present invention is to solve the above problem in the case of using the quinoxaline-based compound as a vulcanizing agent.

Means for Solving the Problems

The present inventors have found that the above object can be achieved by blending an epichlorohydrin-based rubber having satisfactory semi-conductivity and an acrylonitrile-butadiene-based rubber as a reactive plasticizer, and also blending zinc oxide, a thiuram-based compound and a quinoxaline-based compound.

That is, the present invention is characterized in that a rubber composition for a semi-conductive vulcanization comprises, based on 100 parts by weight of a blend rubber comprising (a) 50 to 90% by weight of an epichlorohydrin-based rubber and (b) 10 to 50% by weight of an acrylonitrile-butadiene-based rubber, (c) 0.1 to 5 parts by weight of a thiuram-based compound, (d) 1 to 10 parts by weight of zinc oxide and (e) 0.1 to 5 parts by weight of a quinoxaline-based compound.

Preferably, in the rubber composition for a semi-conductive vulcanization of the present invention, the epichlorohydrin-based rubber (a) is an epichlorohydrin-ethylene oxide-allyl glycidyl ether ternary copolymer.

Preferably, in the rubber composition for a semi-conductive vulcanization of the present invention, a number average molecular weight of the acrylonitrile-butadiene-based rubber (b) is from 1,000 to 20,000.

It is preferred that the rubber composition for a semi-conductive vulcanization of the present invention, the thiuram-based compound (c) is a thiuram sulfide-based compound, it is more preferred that the thiuram-based compound (c) is dipentamethylenethiuram tetrasulfide.

It is preferred that the rubber composition for a semi-conductive vulcanization of the present invention, the quinoxaline-based compound (e) is a 2,3-dimercaptoquinoxaline derivative, it is more preferred that the quinoxaline-based compound (e) is 6-methylquinoxaline-2,3-dithiocarbonate.

A semi-conductive vulcanized rubber material of the present invention is preferably obtained by vulcanizing the rubber composition for a semi-conductive vulcanization.

Effects of the Invention

According to the present invention, it is possible to obtain a rubber composition which has semi-conductivity and low hardness, and also exhibits low compression set. A vulcanizate thereof can be widely applied as developing, charging and transfer rolls in a laser printer and a copying machine.

EMBODIMENTS FOR CARRYING OUT THE INVENTION

The features of the invention are described in detail below.

Semi-Conductive Rubber Composition

The semi-conductive rubber composition of the present invention refers to a rubber composition before vulcanization, and contains at least an epichlorohydrin-based rubber, an acrylonitrile-butadiene-based rubber, a thiuram-based compound, zinc oxide and a quinoxaline-based compound.

Epichlorohydrin-Based Rubber

In the composition of the present invention, the epichlorohydrin-based rubber refers an epichlorohydrin homopolymer or a copolymer with the other epoxide copolymerizable with epichlorohydrin, for example, ethylene oxide, propylene oxide, allyl glycidyl ether or the like, and examples thereof include an epichlorohydrin homopolymer, an epichlorohydrin-ethylene oxide copolymer, an epichlorohydrin-propylene oxide copolymer, an epichlorohydrin-ethylene oxide-allyl glycidyl ether ternary copolymer, an epichlorohydrin-propylene oxide-allyl glycidyl ether ternary copolymer, an epichlorohydrin-ethylene oxide-propylene oxide-allyl glycidyl ether quaternary copolymer and the like. In the present invention, epichlorohydrin-based rubber is preferably an epichlorohydrin homopolymer, an epichlorohydrin-ethylene oxide copolymer or an epichlorohydrin-ethylene oxide-allyl glycidyl ether ternary copolymer, and particularly preferably an epichlorohydrin-ethylene oxide-allyl glycidyl ether ternary copolymer.

The molecular weight of these homopolymers or copolymers is not particularly limited, and is usually from about 30 to 150 in terms of Mooney viscosity $ML_{1+4}$ (100° C.).

In the epichlorohydrin-ethylene oxide-allyl glycidyl ether ternary copolymer, the copolymerization ratio of an epichlorohydrin component is preferably from 5 mol % to 40 mol %, and more preferably from 15 mol % to 40 mol %; the copolymerization ratio of an ethylene oxide component is preferably from 50 mol % to 94 mol %, and more preferably from 55 mol % to 80 mol %; and the copolymerization ratio of an allyl glycidyl ether component is preferably from 1 mol % to 10 mol %, and more preferably from 1 mol % to 5 mol %.

Acrylonitrile-Butadiene-Based Rubber

The acrylonitrile-butadiene-based rubber means a binary copolymer of acrylonitrile and butadiene, or a ternary copolymer of acrylonitrile, butadiene and unsaturated carboxylic acid, and is popularly referred to as a so-called high nitrile (commonly refers to an acrylonitrile-butadiene rubber in which the content of acrylonitrile is from 36 to 42% by weight), medium high nitrile (commonly refers to an acrylonitrile-butadiene rubber in which the content of acrylonitrile is from 31 to 35% by weight), medium nitrile (commonly refers to an acrylonitrile-butadiene rubber in which the content of acrylonitrile is from 25 to 30% by weight), low nitrile (commonly refers to an acrylonitrile-butadiene rubber in which the content of acrylonitrile is 24% by weight or less), carboxynitrile or the like. In the present invention, it is particularly preferred to use a liquid acrylonitrile-butadiene-based rubber having a polystyrene-equivalent number average molecular weight, in the measurement of a molecular weight by a conventional method using gel permeation chromatography (GPO), within a range from 1,000 to 20,000, and more preferably a liquid acrylonitrile-butadiene-based rubber having a number average molecular weight within a range from 3,000 to 10,000. The number average molecular weight is preferably within the above range since hardness of a vulcanizate becomes lower and also it becomes easy to process the composition.

The content of acrylonitrile of the acrylonitrile-butadiene-based rubber used is preferably within a range from 15% by weight to 40% by weight, and more preferably from 20% by weight to 40% by weight. It is not preferred that the content deviates from the above range since a rubber composition is not unified during kneading or a vulcanizate becomes rigid. Also, in the case of the liquid acrylonitrile-butadiene-based rubber, the content of acrylonitrile is preferably within a range from 20% by weight to 40% by weight, and more preferably from 30% by weight to 40% by weight. The content is preferably within the above range since hardness of a vulcanizate becomes lower and also it becomes easy to process the composition.

Regarding the composition of the rubber component in the semi-conductive rubber composition of the present invention, the proportion of the epichlorohydrin-based rubber is preferably from 50 to 90% by weight and the proportion of the acrylonitrile-butadiene-based rubber is preferably from 10 to 50% by weight; and the proportion of the epichlorohydrin-based rubber is more preferably from 60 to 80% by weight and the proportion of the acrylonitrile-butadiene-based rubber is more preferably from 20 to 40% by weight. When the proportion of the epichlorohydrin-based rubber is more than 90% by weight, characteristics of the nitrile rubber are not exhibited, and thus low hardness is not achieved. On the other hand, the proportion of the liquid nitrile rubber is more than 50% by weight, viscosity of the composition becomes very lower and it becomes difficult to process.

Thiuram-Based Compound

Examples of the thiuram-based compound of the present invention include thiuram sulfide-based compounds represented by the following general formula [I]:

[Chemical Formula 1]

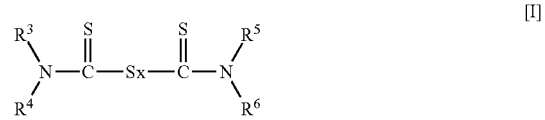

wherein $R^3$, $R^4$, $R^5$ and $R^6$ may be the same or different and represents, for example, a hydrogen atom, an alkyl group, an aryl group, a cycloalkyl group, an aralkyl group or the like; $R^3$, $R^4$ and/or $R^5$ and $R^6$ may be combined with each other to form a ring with or without hetero atom; and x represents an integer of 1 to 6.

Specific examples of the thiuram sulfide-based compound having the above structure include tetramethylthiuram disulfide, tetramethylthiuram monosulfide, tetraethylthiuram disulfide, tetrabutylthiuram disulfide, dipentamethylenethiuram tetrasulfide and the like, and dipentamethylenethiuram tetrasulfide is particularly preferred.

The amount of the thiuram-based compound blended is preferably from 0.1 to 5 parts by weight, and more preferably from 0.2 to 5 parts by weight, based on 100 parts by weight of a blend rubber component of the epichlorohydrin-based rubber and the acrylonitrile-butadiene-based rubber. When the amount is more than 5 parts by weight, the vulcanizate becomes too hard. On the other hand, when the amount is less than 0.1 part by weight, vulcanization does not proceed and thus compression set tends to become worse.

Zinc Oxide

In the semi-conductive rubber composition of the present invention, the amount of zinc oxide blended is preferably from 1 to 10 parts by weight, and more preferably from 3 to 8 parts by weight, based on 100 parts by weight of a blend rubber component of the epichlorohydrin-based rubber and the acrylonitrile-butadiene-based rubber. When the amount of zinc oxide is less than 1 part by weight, it is impossible to obtain the sufficient effect of reducing compression set. On the other hand, when the amount is more than 10 parts by weight, hardness of the vulcanizate becomes too high. Also, a transfer roll or the like formed using the rubber composition for a semi-conductive vulcanization of the present invention may have a problem of compression set. However, when the amount is within the above range, the obtained transfer roll or the like can be used without the problem of compression set, favorably. In the present invention, zinc oxide not only reduces the compression set, but also serves as a vulcanization accelerator activator and an acid acceptor.

Acid Acceptor

In the semi-conductive rubber composition of the present invention, only zinc oxide may be used as an acid acceptor. As long as various properties required as the semi-conductive vulcanized rubber material are not impaired, known acid acceptors can be blended according to the vulcanizing agent, and examples thereof include a metal compound and/or an inorganic microporous crystal. Examples of such a metal compound include an oxide, a hydroxide, a carbonate salt, a carboxylate salt, a silicate salt, a borate salt and a phosphate salt of Group II metals of the Periodic Table; an oxide, a basic carbonate salt, a basic carboxylate salt, a basic phosphate salt, a basic sulfite salt and a tribasic sulfate salt of Group IVA metals of the Periodic Table; and the like.

Specific examples of the metal compound used as the acid acceptor include magnesia, magnesium hydroxide, barium hydroxide, magnesium carbonate, barium carbonate, sodium carbonate, lime, slaked lime, calcium carbonate, calcium silicate, calcium stearate, zinc stearate, calcium phthalate, calcium phosphite, zinc white, tin oxide, litharge, red lead, white lead, bibasic lead phthalate, bibasic lead carbonate, basic lead silicate, tin stearate, basic lead phosphite, basic tin phosphite, basic lead sulfite and tribasic lead sulfate. Particularly preferred acid acceptors include magnesia, calcium carbonate, slaked lime, lime and sodium carbonate.

The inorganic microporous crystal means a porous crystalline material which can be distinguished clearly from porous amorphous materials such as silica gel and alumina. Examples of the inorganic microporous crystal include zeolites, an aluminophosphate type molecular sieve, a layered silicate, a synthetic hydrotalcite and an alkaline metal titanate salt. The acid acceptor is particularly preferably a synthetic hydrotalcite.

Examples of the zeolites include natural zeolites, A-, X-, or Y-type synthetic zeolites, sodalites, natural or synthetic mordenites, ZSM-5, and metal-substituted derivatives thereof, and they may be used alone, or two or more kinds thereof may be used in combination. The metal of the metal-substituted derivative is generally sodium. The zeolites preferably have a large acid acceptability, and are preferably an A-type zeolite.

The synthetic hydrotalcite is represented by the following general formula (I):

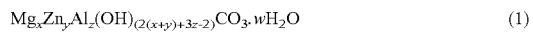

$$Mg_xZn_yAl_z(OH)_{(2(x+y)+3z-2)}CO_3 \cdot wH_2O \quad (1)$$

wherein x and y are real numbers satisfying the relation of x+y=1 to 10, z is a real number of 1 to 5, and w is a real number of 0 to 10.

Examples of the hydrotalcites represented by the general formula (I) include $MG_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}$ $CO_3 \cdot 4H_2O$, $Mg_5Al_2(OH)_{14}CO_3 \cdot 4H_2O$, $Mg_3Al_2(OH)_{10}CO_3 \cdot 7H_2O$, $Mg_3ZnAl_2(OH)_{12}CO_3 \cdot 3.5H_2O$ and $Mg_3ZnAl_2(OH)_{12}CO_3$.

Quinoxaline-Based Compound

Examples of the quinoxaline-based compound include a 2,3-dimercaptoquinoxaline derivative. Specific examples thereof include quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate and the like, and 6-methylquinoxaline-2,3-dithiocarbonate is preferred.

The amount of the quinoxaline-based compound blended is preferably from 0.1 to 5 parts by weight, more preferably from 0.5 to 5 parts by weight, and still preferably from 1 to 3 parts by weight, based on 100 parts by weight of a blend rubber component of the epichlorohydrin-based rubber and the acrylonitrile-butadiene-based rubber. When the amount is less than 0.1 part by weight, the effect as the vulcanizing agent cannot be expected and the compression set tends to become worse. On the other hand, when the amount is more than 5 parts by weigh, hardness of the vulcanizate becomes too high.

Also, known accelerators (i.e. vulcanization accelerator) used together with the vulcanizing agent, retarders and the like can be used as they are in the semi-conductive rubber composition of the present invention.

Examples of the above vulcanization accelerator include sulfur, thiuram sulfides, morpholine sulfides, amines, weak acid salts of amine, basic silica, quaternary ammonium salts, quaternary phosphonium salts, polyfunctional vinyl compounds, mercaptobenzothiazoles, sulfenamides, dimethiocarbamates and the like. Also, specific examples of the vulcanization accelerator include 1,8-diazabicyclo(5,4,0)undecene-7 (hereinafter abbreviated to DBU) salt, 1,5-diazabicyclo(4,3,0)nonene-5 (hereinafter abbreviated to DBN) salt and white carbon. Examples of the DBU salt include a DBU-carbonate salt, a DBU-stearate salt, a DBU-2-ethylhexylate salt, a DBU-benzoate salt, a DBU-salicylate salt, a DBU-3-hydroxy-2-naphthoate salt, a DBU-phenol resin salt, a DBU-2-mercaptobenzothiazole salt, a DBU-2-mercaptobenzimidazole salt and the like; and examples of the DBN salt include a DBN-carbonate salt, a DBN-stearate salt, a DBN-2-ethylhexylate salt, a DBN-benzoate salt, a DBN-salicylate salt, a DBN-3-hydroxy-2-naphthoate salt, a DBN-phenol resin salt, a DBN-2-mercaptobenzothiazole salt, a DBN-2-mercaptobenzimidazole salt and the like. As particularly preferred vulcanization accelerator, sodium stearate or the like is exemplified.

Examples of the above retarder include N-cyclohexanethiophthalimide, an organic zinc compound, an acidic silica and the like.

It is possible to optionally blend compounding agents except for those described above, for example, lubricants, antioxidants, fillers, reinforcers, plasticizers, processing aids, flame retardants, pigments and the like in the semi-conductive rubber composition of the present invention, as long as the effects of the present invention are not impaired. Furthermore, it is possible to conduct blending of rubbers, resins and the like, which is usually conducted in the relevant technical field, as long as characteristics of the present invention are not lost.

Method of Blending Semi-Conductive Rubber Composition

It is possible to use, as the method of blending the semi-conductive rubber composition of the present invention, optional means which may have conventionally been employed in the field of polymer processing, for example, a mixing roll, a Banbury mixer, various kneaders and the like.

Method of Vulcanizing Semi-Conductive Rubber Composition

The semi-conductive vulcanization rubber material of the present invention is usually obtained by heating the above semi-conductive rubber composition to a temperature of 100 to 200° C. Although the vulcanization time varies depending on the temperature, the vulcanization is usually conducted for 0.5 to 300 minutes. It is possible to use, as the method of vulcanization molding, optional methods such as compression molding and injection molding methods using a mold; and heating methods using an air bath, infrared rays or microwave.

EXAMPLES

The present invention will be described more specifically by way of Examples and Specific Examples. However, the present invention is not limited to the following Examples unless departing from the scope of the present invention.

Examples 1 to 2, Comparative Examples 1 to 6

The respective compounding agents shown in the following Table 1 were kneaded by using a pressure kneader at 120° C. to prepare an A-kneaded compound. This A-kneaded compound was kneaded on an open roll to prepare a B-kneaded compound.

The compounding agents used in Examples and Comparative Examples are shown below.

from 25 to 35, in the case of using for a semi-conductive roll. The hardness within the above range is effective from the view point that a contact area between a roll and a photoreceptor can be increased.

A compression set test was measured in accordance with JIS K6262. Namely, the above B-kneaded compound was set in a mold for fabrication of a test piece for a compression set test and then subjected to press vulcanization at 170° C. for 20 minutes, in accordance with JIS K6250, to fabricate columnar vulcanized rubber test pieces (each measuring about 12.5 mm in thickness and about 29 mm in diameter). Furthermore, the obtained test pieces were subjected to secondary vulcanization in an air oven at 150° C. for 2 hours. The compression set varies depending on contents of blending and required characteristics, but is preferably 15% or less, and more preferably 10% or less, in the case of using for a semi-conductive roll. The compression set within the above range is effective from the view point that deformation of a roll is prevented and stable image quality is obtained.

The volume specific resistance value was measured in accordance with JIS K6271. Namely, a vulcanization sheet and an insulation resistance meter (insulation resistance meter HIRESTA HP, manufactured by Mitsubishi Yuka Kabushiki Kaisha) were allowed to stand in a temperature and humidity controlled bath under the conditions of 23° C. and a relative humidity of 50% for 24 hours or more. One minute

TABLE 1

| Kneading | Compounding agents | Example | | Comparative Example | | | | | |
|---|---|---|---|---|---|---|---|---|---|
| | | 1 | 2 | 1 | 2 | 3 | 4 | 5 | 6 |
| A | Epichlorohydrin rubber *1 | 80 | 80 | 80 | 80 | 80 | 80 | 95 | 40 |
| | Liquid nitrile rubber *2 | 20 | 20 | 20 | 20 | 20 | 20 | 5 | 60 |
| | Calcium carbonate (Filler) *3 | 30 | 30 | 30 | 30 | 30 | 30 | 30 | 30 |
| | Stearic acid (Lubricant) | 1 | 1 | 1 | 1 | 1 | 1 | 1 | 1 |
| | Synthetic hydrotalcite (Acid acceptor) *4 | 4 | 4 | 4 | 4 | 4 | 4 | 4 | 4 |
| B | N-cyclohexylthiophthalimide (Retarder) | 0.5 | 0.5 | 0.5 | 0.5 | 0.5 | 0.5 | 0.5 | 0.5 |
| | Zinc oxide | 5 | 5 | — | 5 | — | — | 5 | 5 |
| | Dipentamethylenethiuram tetrasulfide(Vulcanizing agent) | 2 | 5 | 2 | — | — | 2 | 2 | 2 |
| | 6-methylquinoxaline-2, 3-dithiocarbonate(Vulcanizing agent) | 1.5 | 1.5 | 1.5 | 1.5 | 1.5 | — | 1.5 | 1.5 |

*1: Epichlorohydrin-ethylene oxide-allyl glycidyl ether ternary copolymer "EPICHLOMER CG-102", Mooney viscosity: $ML_{1+4}$(100° C.) = 48, manufactured by DAISO CO., LTD.
*2: Liquid (medium high) nitrile rubber "JSR N280", the content of acrylonitrile: 32% by weight, manufactured by JSR Corporation
*3: Light calcium carbonate "Silver-W", manufactured by SHIRAISHI CALCIUM KAISHA, LTD.
*4: Synthetic hydrotalcite "DHT-4A", manufactured by Kyowa Chemical Industry Co., Ltd.

A sheet formed of the B-kneaded compound thus prepared was placed in a mold immediately after kneading and then subjected to press vulcanization at 170° C. for 15 minutes, in accordance with JIS K6250, to form a vulcanized rubber sheet. Furthermore, the vulcanized rubber sheet was further subjected to secondary vulcanization in an air oven at 150° C. for 2 hours.

Hardness of the vulcanization rubber sheet was measured in accordance with JIS K6253. The hardness varies depending on contents of blending and required characteristics, but is preferably within a range from 20 to 40, and more preferably after applying 10 V, a value was read. The volume (specific) resistance value varies depending on contents of blending and required characteristics, but is preferably from $1.0 \times 10^4$ Ω·cm to $1.0 \times 10^{10}$ Ω·cm, and more preferably from $1.0 \times 10^5$ Ω·cm to $1.0 \times 10^9$ Ω·cm, in the case of using for a semi-conductive roll. The volume resistance value within the above range is effective from the view point that stable image quality can be obtained even in the case of printing at a high speed.

The test results of Examples and Comparative Examples obtained by each test method are shown in Table 2.

TABLE 2

| Evaluation results | Example | | Comparative Example | | | | | |
|---|---|---|---|---|---|---|---|---|
| | 1 | 2 | 1 | 2 | 3 | 4 | 5 | 6 |
| Hardness SHORE A | 32 | 33 | 35 | Immoldable | Immoldable | Immoldable | 41 | Immoldable |
| Compression set (%) JIS K6262 (at 0° C. for 22 hours) | 10 | 9 | 20 | | | | 10 | |
| Volume (specific) resistance value ($\Omega \cdot cm$) at 23° C. and 50% RH | $1.8 \times 10^8$ | $2.0 \times 10^8$ | $9.0 \times 10^7$ | | | | $2.5 \times 10^8$ | |

The evaluation results shown in Table 2 could reveal that, in Examples, the obtained rubber vulcanizates have low hardness and extremely excellent compression set while maintaining semi-conductivity. On the other hand, in Comparative Example 1, a vulcanizate could be obtained by using a thiuram-based compound and a quinoxaline-based compound. However, since zinc oxide was not blended, deterioration of the compression set due to the addition of a liquid acrylonitrile-butadiene-based rubber (liquid nitrile rubber) was confirmed in comparison with Example 1. In Comparative Example 2, since a thiuram-based compound was not blended, vulcanization could not be accelerated even after press and a rubber material (molded article) could not be obtained. In Comparative Example 3, since zinc oxide and a thiuram-based compound were not blended, vulcanization could not be accelerated even after press. In Comparative Example 4, since zinc oxide and a quinoxaline-based compound were not blended, vulcanization could not be accelerated even after press and a rubber material (molded article) could not be obtained, similar to Comparative Examples 2 and 3. In Comparative Example 5, since the proportion of an epichlorohydrin rubber is high, semi-conductivity could be ensured. However, since the proportion of a liquid nitrile rubber is low, the hardness becomes higher and it was confirmed that a rubber material (molded article) suited for uses such as a semi-conductive roll cannot be obtained. In Comparative Example 6, it was confirmed that since the proportion of a liquid nitrile rubber is high, even when a vulcanizing agent such as a quinoxaline-based compound or a thiuram-based compound is blended, sufficient vulcanization does not proceed and it is in a state where press itself cannot be conducted.

INDUSTRIAL APPLICABILITY

The semi-conductive rubber material obtained by vulcanizing the rubber composition for vulcanization as a subject matter of the present invention is a material which realizes low hardness and low volume specific resistance value and is also excellent in compression set, and can be widely applied as a developing roll, a charging roll and a transfer roll in a laser printer and a copying machine.

The invention claimed is:
1. A rubber composition for a semi-conductive vulcanization, comprising, based on 100 parts by weight of a blend rubber comprising
   (a) 50 to 90% by weight of an epichlorohydrin-based rubber and
   (b) 10 to 50% by weight of a liquid acrylonitrile-butadiene-based rubber,
   (c) 0.1 to 5 parts by weight of a thiuram-based compound,
   (d) 1 to 10 parts by weight of zinc oxide and
   (e) 0.1 to 5 parts by weight of a quinoxaline-based compound.
2. The rubber composition for a semi-conductive vulcanization according to claim 1, wherein the epichlorohydrin-based rubber (a) is an epichlorohydrin-ethylene oxide-allyl glycidyl ether ternary copolymer.
3. The rubber composition for a semi-conductive vulcanization according to claim 1, wherein a number average molecular weight of the acrylonitrile-butadiene-based rubber (b) is from 1,000 to 20,000.
4. The rubber composition for a semi-conductive vulcanization according to claim 1, wherein the thiuram-based compound (c) is a thiuram sulfide-based compound.
5. The rubber composition for a semi-conductive vulcanization according to claim 1, wherein the thiuram-based compound (c) is dipentamethylenethiuram tetrasulfide.
6. The rubber composition for a semi-conductive vulcanization according to claim 1, wherein the quinoxaline-based compound (e) is a 2,3-dimercaptoquinoxaline derivative.
7. The rubber composition for a semi-conductive vulcanization according to claim 1 wherein the quinoxaline-based compound (e) is 6-methylquinoxaline-2,3-dithiocarbonate.
8. A semi-conductive vulcanized rubber material obtained by vulcanizing the rubber composition for a semi-conductive vulcanization according claim 1.
9. The rubber composition for a semi-conductive vulcanization according to claim 1, wherein a weight fraction of the epichlorohydrin-based rubber (a) is 60 to 80% and a weight fraction of the liquid acrylonitrile-butadiene-based rubber 20 to 40%.
10. The rubber composition for a semi-conductive vulcanization according to claim 1, wherein a weight fraction of the epichlorohydrin-based rubber (a) is 80 to 90% and a weight fraction of the liquid acrylonitrile-butadiene-based rubber 10 to 20%.
11. The rubber composition for a semi-conductive vulcanization according to claim 1, wherein the epichlorohydrin-based rubber is an epichlorohydrin-ethylene oxide-allyl glycidyl ether ternary copolymer, the copolymerization ratio of which is from 55 mol % to 80 mol %.

* * * * *